US011859258B2

(12) United States Patent
Lapierre et al.

(10) Patent No.: US 11,859,258 B2
(45) Date of Patent: *Jan. 2, 2024

(54) CONTROLLER OF THE RELEASE OF ENERGY OF A COMBUSTION OF BIOMASS, SYSTEM PROVIDED WITH SUCH A CONTROLLER, KIT FOR ASSEMBLING THE SAME, AND CORRESPONDING METHODS OF ASSEMBLING, OPERATING AND USE ASSOCIATED THERETO

(71) Applicant: LES ÉQUIPEMENTS LAPIERRE INC., St-Ludger (CA)

(72) Inventors: Donald Lapierre, Saint-Ludger (CA); Carl Lapierre, St-Ludger (CA); Gabriel Boucher, Roxton-Fall (CA); Luc Brière, Asbestos (CA); André Fillion, Saint-Georges (CA); Jean-François Goulet, St-Damien-de-Buckland (CA)

(73) Assignee: LES ÉQUIPEMENTS LAPIERRE INC., Saint-Ludger (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,622

(22) Filed: Sep. 12, 2022

(65) Prior Publication Data

US 2023/0002840 A1 Jan. 5, 2023

Related U.S. Application Data

(63) Continuation of application No. 16/859,414, filed on Apr. 27, 2020, now Pat. No. 11,441,199.

(Continued)

(51) Int. Cl.

*C13B 25/04* (2011.01)
*C13B 25/06* (2011.01)

(52) U.S. Cl.

CPC .............. *C13B 25/04* (2013.01); *C13B 25/06* (2013.01)

(58) Field of Classification Search

CPC ....... C13B 25/04; C13B 25/06; C13B 30/005; C13B 30/002; B01D 29/15; B01D 29/96; C13K 1/02

(Continued)

(56) References Cited

U.S. PATENT DOCUMENTS 4,053,399 A * 10/1977 Donnelly .................. C02F 1/78 210/764
4,531,462 A * 7/1985 Payne ........................ C10J 3/40 110/101 CD (Continued)

FOREIGN PATENT DOCUMENTS

CA 2 738 432 C 1/2014
CN 2758641 Y 2/2006

(Continued)

OTHER PUBLICATIONS

Translation of JP_5309799_B2_M.pdf (Year: 2013).*
Translation of CN_102925593_A_M.pdf (Year: 2013).*
WaterMaze, HBG Conventional Wastewater Evaporator with High-Efficiency Combustion Chamber, Jul. 25, 2007 (Year: 2007).

*Primary Examiner* — Ekandra S. Miller-Cruz
(74) *Attorney, Agent, or Firm* — Merchant & Gould P.C.

(57) ABSTRACT

An evaporator system used for the production of maple syrup. The evaporator system comprises at least one receptacle for receiving and processing maple water destined to be transformed, a combustion chamber for burning biomass, and a detector of temperature of the combustion. The evaporator system also comprises an air supply system being operatively mounted with respect to the combustion chamber for feeding the same with air destined to be used in the combustion of the biomass, the air supply system offering at least one type of air supply to the combustion chamber (Continued)

selected from the group consisting of a primary air supply, a secondary air supply and an intermediate air supply, the air supply system including at least one corresponding fan for generating said at least one type of air supply to the combustion chamber, and said at least one fan being configured for transmitting an air flow being automatically variable according to the operating temperature in the combustion chamber, so as to control the release of energy from the combustion of the biomass in the combustion chamber, thus in order to enable a more constant release of energy in the combustion chamber during the production of maple syrup.

17 Claims, 8 Drawing Sheets

Related U.S. Application Data

(60) Provisional application No. 62/838,670, filed on Apr. 25, 2019.

(58) Field of Classification Search
USPC .................. 210/167.01, 731; 127/61, 167.07
See application file for complete search history.

(56) References Cited

U.S. PATENT DOCUMENTS

| | | | | |
|---|---|---|---|---|
| 4,832,000 | A * | 5/1989 | Lamppa | F24B 5/026 126/77 |
| 5,263,471 | A * | 11/1993 | Shimek | F23L 9/02 126/528 |
| 5,275,666 | A * | 1/1994 | Goodrich | B01D 3/346 127/11 |
| 9,005,400 | B2 * | 4/2015 | Wechsler | C10B 47/44 585/242 |
| 9,309,576 | B2 | 4/2016 | Tay | |
| 2008/0029129 | A1 * | 2/2008 | Mann | F28G 3/16 134/198 |
| 2010/0089295 | A1 * | 4/2010 | Moench | F23B 30/06 110/255 |
| 2012/0085339 | A1 | 4/2012 | Eldabbagh et al. | |
| 2012/0272876 | A1 | 11/2012 | Bergeron et al. | |

FOREIGN PATENT DOCUMENTS

| | | | | |
|---|---|---|---|---|
| CN | 102925593 | A * | 2/2013 | C13B 25/06 |
| CN | 104946802 | A | 9/2015 | |
| JP | 2935958 | B2 | 8/1999 | |
| JP | 5309799 | B2 * | 10/2013 | Y02E 60/50 |
| JP | 5309799 | B2 | 10/2013 | |

* cited by examiner

CONTROLLER OF THE RELEASE OF ENERGY OF A COMBUSTION OF BIOMASS, SYSTEM PROVIDED WITH SUCH A CONTROLLER, KIT FOR ASSEMBLING THE SAME, AND CORRESPONDING METHODS OF ASSEMBLING, OPERATING AND USE ASSOCIATED THERETO

CROSS-REFERENCE TO RELATED APPLICATIONS

This application is a Continuation of U.S. patent application Ser. No. 16/859,414, filed 27 Apr. 2020, which claims the benefit of U.S. Patent Application Ser. No. 62/838,670, filed 25 Apr. 2019, and which applications are incorporated herein by reference. To the extent appropriate, a claim of priority is made to each of the above-disclosed applications.

FIELD OF THE INVENTION

The present invention relates to the field of the production of syrup, such as maple syrup, for example, and/or any other type of syrup. More particularly, the present invention relates to a controller intended to control the release of energy from a combustion of biomass (ex. wood, etc.), as used in an evaporator, for example, and also relates to a production system provided with such a controller, as well as to a kit for assembling the same, and to corresponding methods of manufacturing, operating and/or use associated thereto.

DESCRIPTION OF PRIOR ART

Parameters affecting the release of energy by combustion of biomass (ex. wood, etc.), in a combustion chamber (ex. a fireplace, a hearth, etc.) are the nature of the biomass and the quantity of combustion air required to ensure the chemical reaction of the combustion.

By controlling the quantity of combustion air allowed into the combustion chamber, it is possible to control the speed of the combustion of the biomass, which enables to directly control the release of the energy.

For any combustion, there exists an ideal ratio of the mixture of fuel (ex. biomass) and of the combustion air. If there is not enough combustion air, the combustion is incomplete which generates smoke, and toxic products, such as furans and carbon monoxide, etc. If there is too much combustion air, the temperature of the gases resulting from the combustion is lower, which affects the efficiency potential of recuperating the thermal energy contained in the gases for heating purposes, etc.

Furthermore, when the combustion technology by gasification of the biomass is used, the combustion air is typically injected in two steps: "primary" air which ensures a portion of the combustion that is used to gasify the biomass, and "secondary" air, which ensures the combustion of the gases produced by the gasification.

Typically, in the case of a wood evaporator for purposes of maple syrup production, for example, the control of the release of the energy is done from the temperature of the surface of the syrup casserole (caramelization, cooking). Furthermore, the control of the release of energy of the biomass in a conventional evaporator is normally assured by a human person, either an operator (or "boiler"), that must typically, based on own experience and/or own preferences according to desired final product (ex. quality and features of the resulting syrup, etc.), attempts to control several parameters at the same time, and this, instinctively or qualitatively, namely: a) monitoring the temperature in the combustion zone of the biomass in order to ensure a constant production of gas; b) monitoring the temperature of the combustion gases once the complete combustion is done so as to ensure that the optimal temperature for the use of the combustion gases is maintained; c) monitoring the chemical composition of the combustion products, in order to validate that the combustion is complete; d) controlling the quantity of primary air allowed; and e) controlling the quantity of secondary allowed air allowed.

One of the greatest challenges for an operator is that to try to maintain a temperature range as constant as possible, and for as long as possible, during the process of combustion, because the behaviour of the temperature is not linear, and is subject to different and various variations during the process, namely at certain different steps of the combustion process (ex. starting, reload, etc.), which could have adverse consequences, namely on the quality of the combustion, on the quality of the resulting product (ex. a syrup which is "lighter" versus a syrup that is "darker", etc.), on the quality of emission pollutants being produced, on the quantity of biomass (ex. wood, etc.) being used, etc.

Consequently, it would be greatly advantageous to find a new way of controlling the release of energy of a combustion of biomass, as used in an evaporator, for example, and to be able to do so in a quicker, simpler, more precise, more efficient, more economical, more reliable, more adjustable, more versatile, more adaptable, more durable, more environmentally conscientious, more desirable, and/or improved manner, than what is possible with the actual way of doing things.

SUMMARY OF THE INVENTION

An object of the present invention is therefore to provide a controller (and/or system including such a controller, etc.) which by virtue of its design and its modulable and/or programmable components, would satisfy some of the above-mentioned needs, and which would thus be an improvement over other related controllers, systems and/or methods known in the prior art.

The above main object is achieved, as will be better understood, by a controller (and/or resulting evaporator system including such a controller, etc.), such a driving system) such as the one briefly described in the present description, and such as the one exemplified in the accompanying drawings.

More particularly, and according to a possible embodiment of the present invention, an objective is to provided an evaporator system used for the production of maple syrup, the evaporator system comprising:

- at least one receptacle for receiving and processing maple water destined to be transformed into maple syrup;
- a combustion chamber being operatively disposed with respect to said at least one receptacle for feeding the same with heat destined to be used in the transformation of the maple water into maple syrup, the combustion chamber having an inlet for receiving and burning biomass inside of the combustion chamber, exhaust gases of the combustion chamber being evacuated via a chimney of the evaporator system;
- a detector of temperature being operatively connected to the combustion chamber for determining an operating temperature inside of the combustion chamber; and
- an air supply system being operatively mounted with respect to the combustion chamber for feeding the same with air destined to be used in the combustion of the biomass, the air supply system offering at least one type of air supply to the combustion chamber selected from the group consisting of a primary air supply, a secondary air supply and an intermediate air supply, the air supply system including at least one corresponding fan for generating said at least one type of air supply to the combustion chamber, and said at least one fan being configured for transmitting an air flow being automatically variable according to the operating temperature in the combustion chamber, so as to control the release of energy from the combustion of the biomass in the combustion chamber, thus in order to enable a more constant release of energy in the combustion chamber during the production of maple syrup.

Indeed, such an evaporator system provided with such a system of control of the release of energy of the combustion of the biomass in the combustion chamber enables namely, and advantageously, a more constant release of energy in the combustion chamber during the production of maple syrup, so as to thus have a better production of resulting maple syrup, including a syrup of greater quality, etc.

According to another aspect of the present invention, there is also provided a kit with corresponding components for assembling the above-mentioned controller and/or evaporator system.

According to another aspect of the present invention, there is also provided a method of assembling components of the above-mentioned controller and/or evaporator system.

According to another aspect of the present invention, there is also provided a method of operating the above-mentioned controller and/or evaporator system.

According to another aspect of the present invention, there is also provided a method of using the above-mentioned controller and/or evaporator system.

According to another aspect of the present invention, there is also provided a set of components to be interchanged on the above-mentioned controller and/or evaporator system.

According to another aspect of the present invention, there is also provided a method of manufacturing one or another of the components of the above-mentioned controller and/or evaporator system.

According to another aspect of the present invention, there is also provided a product (ex. syrup) having been obtained with the above-mentioned controller, evaporator system, kit and/or method(s).

According to another aspect of the present invention, there is also provided a method of doing business with the above-mentioned controller, evaporator system, kit, method(s), set and/or product.

The objects, advantages, and other features of the present invention will become more apparent upon reading of the following non-restrictive description of preferred embodiments thereof, with reference to the accompanying drawings, and given for the purpose of exemplification only.

BRIEF DESCRIPTION OF THE ENCLOSED DRAWINGS

DESCRIPTION OF PREFERRED EMBODIMENTS OF THE INVENTION

Figure 1:
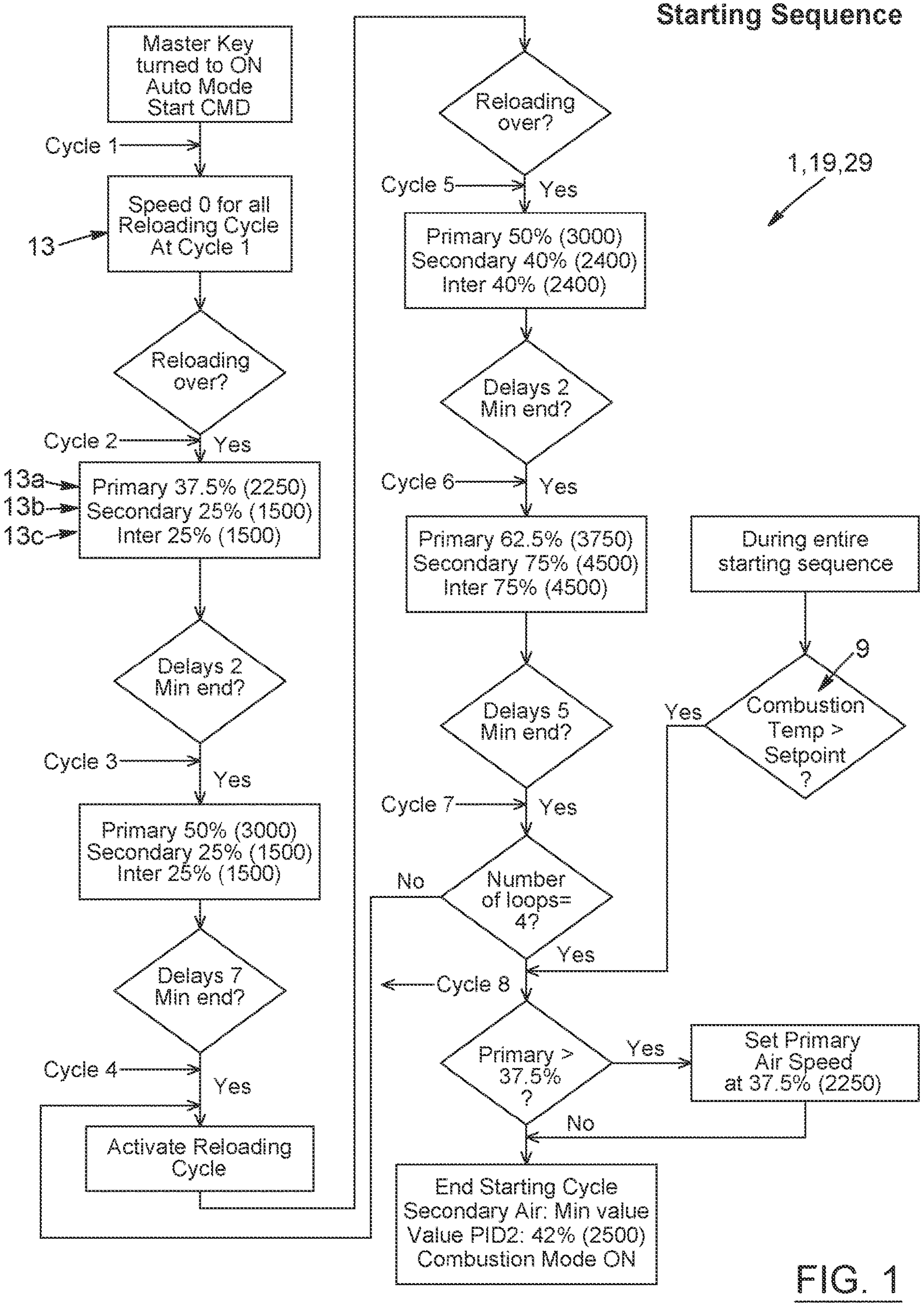
FIG. 1 is a schematic view of a flowchart of a "starting" sequence of a controller according to a particular embodiment of the present invention.

In the following description, the same numerical references refer to similar elements. The embodiments (ex. geometrical configurations, dimensions, materials, etc.) illustrated in the figures and the features described in the application are preferred only, given for exemplification purposes only.

Moreover, although the present invention was primarily designed for an "evaporator" system (or simply, an "evaporator") using wood as biomass and intended to be used for syrup production purposes, such as that of maple syrup, for example, the invention may be used with any other type of system and/or for any other type pf application and/or useful end, as apparent to a person skilled in the art. For this reason, expressions such as "evaporator", "biomass", "wood", "production", "syrup", "maple", etc., as used herein, and/or any other reference and/or expression equivalent or similar to these expressions should not be taken so as to limit the scope of the present invention and include any other kind of object/substitute and/or any other application with which the present invention could be used and may be useful, as apparent to a person skilled in the art.

In addition, although the preferred embodiments of the system as illustrated in the accompanying drawings comprise various components, not all of these components are essential to the invention and thus should not be taken in their restrictive sense, i.e. should not be taken so as to limit the scope of the present invention. It is to be understood, as also apparent to a person skilled in the art, that other suitable components and geometries and/or other suitable cooperations thereinbetween may be used for the system according to the present invention, as will be briefly explained herein, without departing from the scope of the present invention.

Moreover, expressions such as "controller", "program", "software", "retrofit", "control panel", "kit", "system", "device", "assembly", "mechanism", "product", "apparatus", "evaporator", etc., as well as any other equivalent expression(s) and/or compound word(s) thereof, may be used interchangeably in the context of the present description, as apparent to a person skilled in the art. This applies also for any other mutually equivalent expressions, such as: a) "production", "transformation", "refinement", "caramelization", "cooking", "densifying", "modifying", etc.; b) "syrup", "fluid", "liquid", "water", "sap", "product", etc.; c)

"combustion chamber", "combustion zone", "source of combustion", "source of heat", "source of thermal energy", etc.; d) "biomass", "wood", "lignocellulose material", "fuel", "combustion material", etc.; e) "exhaust gases", "combustion products", etc.; f) "detector of temperature", "thermometer", "thermocouple", "thermistor", "infrared probe", etc.; g) "controller", "command", "computer", "circuit", "hardware", "software", "program", "electric, electronic and computer components", etc.; as well as any other mutually equivalent expressions, related to the aforementioned expressions and/or to any other structural and/or functional aspects of the present invention, as also apparent to a person skilled in the art.

Furthermore, in the context of the present description, it will be considered that all elongated objects will have an implicit "longitudinal axis" and/or a "centerline", such as the longitudinal axis of shaft, for example, or the centerline of a conduit, and that expressions such as "connected" and "connectable", or "pivoting" and "pivotable", may be interchangeable and are mutually equivalent, in that the present invention also relates to a kit with corresponding components for assembling a resulting fully-assembled and fully-operational controller and/or resulting system for carrying out the present method and/or obtaining any resulting and/or derived result.

Moreover, certain components of the present system and/or steps of the present method(s) (ex. assembling, operating, etc.) being described herein could be modified, simplified, omitted and/or interchanged, without departing from the scope of the present invention, depending on the particular application(s) which the present invention is designed and/or intended for, and the desired end result(s), as briefly exemplified herein and as also apparent to a person skilled in the art.

Broadly described, the present invention, as illustrated in the accompanying figures, relates to device enabling an automated control of the quantity of energy being released in time, by the combustion of biomass (ex. wood, etc.), by managing mechanisms enabling to modulate the quantity of energy being released in time by the process of combustion of the biomass while ensuring an optimal combustion at low emission, and also relates to an evaporator system provided with such a controller. The present invention also relates to a kit with corresponding components intended for assembling the same (ex. controller and/or evaporator system), and/or to put into practice the resulting controller and/or evaporator system, as well as to corresponding methods of assembling, operating and/or use associated thereto.

Such an evaporator system provided with such a system of control of the release of energy of the combustion of the biomass in the combustion chamber enables namely, and advantageously, a more constant release of energy in the combustion chamber during the production of maple syrup, in order to thus have a better production of resulting maple syrup, including a maple syrup of greater quality etc.

According to a possible embodiment of the present system, the evaporator comprises a detector of temperature in the combustion chamber, and/or a detector of temperature at the outlet of the evaporator, and the detector of composition of the exhaust gases may be a detector of $CO_2$, for example (in order to obtain optimal ratios of presence of $CO_2$ (ex. about 12%) at the exhaust, etc.). It is to be noted also that the detection of the composition of the exhaust gases of the combustion chamber can be made by other alternative manners being technically equivalent and contemplated by the present system, such as with a device for detecting the conductivity of the flame, for example.

According to another possible embodiment of the present system, the evaporator comprises a supply system of primary air and/or a supply system of secondary air, each being able to be provided, if need may be, with an air exchanger, for example. The quantities of primary air and/or secondary air can be brought to the combustion chamber in different ways, such as with a motor of variable speed, or by one or several motorized shutter(s), for example. Indeed, it is to be noted that according to the present evaporator system, the supply of air can be modulated according to the needs of the combustion.

Indeed, and as will be better understood when referring to the patent specification that follows and the corresponding figures enclosed herewith, the present evaporator system enables to modulate the release of energy of a process of combustion by modulating the quantity of fuel being used and/or the quantity of oxidizer (combustion air), and this, in an "automatic" manner (contrary to the "instinctive" manner that is presently used in the art, with corresponding drawbacks explained above).

Namely, according to one aspect of the present invention, an object is to propose a programmable automated system capable of modulating the release of energy of a process of combustion by modulating the quantity of fuel being used and/or the quantity of oxidizer (combustion air) of an evaporator intended to produce syrup.

The present invention enables namely and advantageously to carry out various steps in the control of the release of energy of the biomass, and this, in a controlled, automatic, and predictable manner, namely: a) monitoring the temperature in the combustion zone of the biomass in order to ensure a constant production of gases; b) monitoring the temperature of the combustion gases once the complete combustion is done in order to ensure that the optimal temperature for the use of the combustion gases is maintained; c) monitoring the chemical composition of the combustion products, in order to validate that the combustion is complete; d) controlling the quantity of primary air being allowed in; and e) controlling the quantity of secondary air being allowed in, in this, without a continuous monitoring by a physical person, and without this person having to rely on own experience and/or on own preferences, in an instinctive or qualitative manner, etc.

Indeed, the present invention also enables to carry out in an automated manner all of the steps in the control of the release of energy of the biomass and this, in a very precise and efficient manner.

The system may be programmable according to particular conditions of each producer such as, for example: a) the dimensions of own evaporator, b) the concentration of total solids in the liquid to be processed, c) as well as particular features of the installation, such as altitude, the configuration of the chimney, etc.

The reading of the following paragraphs, in association with the drawings, will enable to better understand how the advantages having been announced are associated with the technical novelties of the invention.

LIST OF NUMERICAL REFERENCES AND/OR OF CORRESPONDING PREFERENTIAL COMPONENTS ILLUSTRATED IN THE ENCLOSED DRAWINGS AND/OR BEING POSSIBLE FOR THE PRESENT SYSTEM

1. evaporator system
3. receptable (ex. casserole)
5. combustion chamber

7. chimney
9. detector of temperature (of the combustion chamber)
11. air supply system
13. fan
**13*a***. fan of primary air
**13*b***. fan of secondary air
**13*c***. fan of intermediate air
15. detector of composition (of the exhaust gases)
17. detector of temperature (of the exhaust gases)
19. controller
21. control panel
23. physical button (of the controller)
25. touchscreen
27. tactile button (of the controller)
29. staring sequence
31. "combustion" sequence (i.e. "operating mode")
33. reload sequence
35. stoppage sequence The present evaporator system (and the different inventive aspects thereof) can take-on different forms and/or expressions, including one and/or several of the following components and features (and/or different combination(s) and/or permutation(s) thereof), given as optional and/or preferential embodiment(s) only:

Indeed, and generally, as better illustrated in the enclosed drawings, the present evaporator system is used for the production of maple syrup (to be noted: the expression "maple syrup" in the context of the present patent specification must be interpreted in a "large" sense in that the present system can be used for the production of various other types of syrups, as evident for a person skilled in the art). The evaporator system comprises at least one receptacle (ex. boiling casserole and/or at least one caramelization casserole) for receiving and processing maple water destined to be transformed into maple syrup. The evaporator system also comprises a combustion chamber being operatively disposed with respect to said at least one receptacle for feeding the same with heat destined to be used in the transformation of the maple water into maple syrup, the combustion chamber having an inlet for receiving and burning biomass inside of the combustion chamber, exhaust gases of the combustion chamber being evacuated via a chimney of the evaporator system. This inlet can be simply, for example, an access door being operable between an opened position for receiving the biomass and a closed position for burning the biomass inside of the combustion chamber. Alternatively, it is possible to use the present evaporator system for controlling a standardized combustion of biomass such as wood granules and/or wood chips, for example. In such a case, the feeding could be done in a continuous manner via a specific access, therefore there is no door to be opened in order to carry out an addition of fuel, the frequency of feeding would be then controlled by the system, as apparent by a person skilled in the art. The evaporator system also comprises a detector of temperature being operatively connected to the combustion chamber for determining an operating temperature inside of the combustion chamber. The evaporator system also comprises an air supply system being operatively mounted with respect to the combustion chamber for feeding the same with air destined to be used in the combustion of the biomass, the air supply system offering at least one type of air supply to the combustion chamber selected from the group consisting of a primary air supply, a secondary air supply and an intermediate air supply, the air supply system including at least one corresponding fan for generating said at least one type of air supply to the combustion chamber, and said at least one fan being configured for transmitting an air flow being automatically variable according to the operating temperature in the combustion chamber, so as to control the release of energy from the combustion of the biomass in the combustion chamber, thus in order to enable a more constant release of energy in the combustion chamber during the production of maple syrup, etc.

According to a particular embodiment, the evaporator system comprises a detector of the composition of the exhaust gases in the combustion chamber so as to be able to manage a control of the release of energy of the combustion of the biomass in the combustion chamber according to a reading of the detector of the composition of the exhaust gases. The detector of the composition of the exhaust gases may be a detector of carbon dioxide ($CO_2$), for example. The detector of the composition of the exhaust gases is positioned in an outlet of the evaporator system, and optionally, the detector of the composition of the exhaust gases may be positioned in the chimney of the evaporator system, for example.

It is to be noted that the detection of the composition of the exhaust gases can be done with a device for detecting a conductivity of a flame of the combustion of the biomass. Also, the detection of the composition of the exhaust gases can be done with a lambda probe for measuring a ratio of $CO_2/O_2$.

Preferably, said at least one fan of the air supply system offering at least one type of air supply to the combustion chamber, is adjusted automatically so as to aim for a level of carbon dioxide ($CO_2$) ensuring an optimal combustion of the biomass (ex. a rate of carbon dioxide ($CO_2$) of about 12% in the exhaust gases of the combustion chamber of the evaporator system).

The air supply system offering at least one type of air supply to the combustion chamber, can be provided with a heat exchanger (namely, a heat exchanger enabling to preheat the combustion air). However, the present system can manage an evaporator without a heat exchanger as well.

Preferably, the air supply system offering at least one type of air supply to the combustion chamber, is provided with at least one corresponding modulating adjustment device (ex. a motor with variable speed, a shutter for regulating the influx of air, and/or any equivalent/appropriate device) for each type of air supply, and the evaporator system comprises a detector of temperature of the exhaust gases being positioned in an outlet (ex. the chimney and/or elsewhere) of the evaporator system.

According to a particular embodiment, the variation of the debit of air of said at least one fan of the air supply system offering at least one type of air supply to the combustion chamber, is done continuously and automatically by means of a controller according to a reading of the operating temperature inside of the combustion chamber. The controller may include a "manual" mode and an "automatic" mode, for example.

In the "automatic" mode, and preferably, the present evaporator system is managed so that: a) the controller commands said at least one fan of the air supply system offering at least one type of air supply to the combustion chamber, to increase its debit of primary air if the temperature of the combustion chamber is below a given setpoint temperature of the evaporator system; b) the controller also commands said at least one fan of the air supply system offering at least one type of air supply to the combustion chamber, to decrease its debit of secondary air if the composition of the exhaust gases is below a given setpoint percentage in terms of $CO_2$ present in the exhaust gases of the evaporator system; c) the controller also commands said at least one fan of the air supply system offering at least one type of air supply to the combustion chamber, to increase its debit of secondary air if the composition of the exhaust gases is above a given setpoint percentage in terms of $CO_2$ present in the exhaust gases of the evaporator system; d) the controller also commands said at least one fan of the air supply system to decrease its debit of primary air if the temperature of the exhaust gases of the combustion chamber is above a given setpoint temperature of the evaporator system.

According to another possible embodiment, and referring generally to FIG. 1 of the present application, the controller includes a starting sequence.

This starting sequence may include a step of feeding with electricity the evaporator system and of its controller. The step of feeding with electricity the evaporator system and of its controller may be activated by pressing on an activation button present on a control panel of the evaporator system, for example. The starting sequence may include a step where said at least one fan of the air supply system offering at least one type of air supply to the combustion chamber, is adjusted to zero. The starting sequence may also include a step of opening an access door of the combustion chamber for allowing an introduction of biomass into said combustion chamber, as well as a step of closing of the access door of the combustion chamber. The starting sequence may also include comprises a step of confirmation of closing of the access door of the combustion chamber, which may be confirmed by an operator of the evaporator system by pressing, for example, a corresponding button of the control panel (either the same button as the aforementioned one and/or another one), and/or or which could be automatically detected and/or validated by a door detection device of the controller of the evaporator system.

As can be understood when referring to FIG. 1, the starting sequence may include a step where said at least one fan of the air supply system offering at least one type of air supply to the combustion chamber, is operated at a preestablished value during at least one given range of time. Said at least one given range of time may include at least two given ranges of time, or at least three given ranges of time. According to a possible embodiment, each given range of time is substantially equivalent in terms of time to that of a preceding range of time, and each given range of time lasts a predetermined period (ex. about 5 minutes, given for exemplification purposes only). Alternatively, each given range of time could be different in terms of time to that of a preceding range of time. For each given range of time, said at least one fan of the air supply system offering at least one type of air supply to the combustion chamber, is operated at a preestablished value being greater than that of a preceding given range of time.

Preferably, starting sequence is automatically stopped by the controller of the evaporator system when the operating temperature in the combustion chamber reaches a given setpoint temperature having been previously entered by an operator of the evaporating system into the control panel of the controller, and the controller automatically allows the evaporator system to pass to another operating sequence when the operating temperature in the combustion chamber reaches the given setpoint temperature.

As can also be understood when referring to FIG. 1, and if need may be, said at least one fan of the corresponding air supply system offering at least one type of air supply to the combustion chamber, is operated at a preestablished value being greater than that of a preceding given range of time, and during at least one additional given range of time, until the operation temperature in the combustion chamber reaches the given setpoint temperature, and if necessary, the at least one additional given range of time can be preceded by an introduction of biomass in the combustion chamber.

If need may be also, said at least one fan of the air supply system offering at least one type of air supply to the combustion chamber, is operated at a preestablished value being greater than that of a previous given range of time, and during at least one subsequent given range of time, until the operating temperature in the combustion chamber reaches the given setpoint temperature, and if necessary, said at least one subsequent given range of time may be preceded by an introduction of biomass in the combustion chamber.

According to a possible embodiment, and referring to the enclosed figures, the air supply system includes at least one fan selected from the group consisting of a fan of primary air, a fan of secondary air and/or a fan of intermediate air. Consequently, and optionally, the starting sequence includes a step where the fan of primary air, the fan of secondary air and the fan of the intermediate air, are operated at different preestablished values, during several different ranges of time, so as to bring the combustion chamber to a desired operating temperature.

Preferably, the fan of primary air, the fan of secondary air and/or the fan of intermediate air, are adjusted automatically by the controller in accordance to the operating temperature desired in the combustion chamber, corresponding to a given setpoint temperature previously entered by an operator of the evaporator system into the control panel of the controller. Typically, for the production of maple syrup, the given setpoint temperature is located between about 1200° F. and about 1900° F.

Preferably also, the starting sequence is automatically stopped by the controller of the evaporator system when the operating temperature in the combustion chamber reaches the given setpoint temperature, so as to automatically pass to another operating sequence of the evaporator system. The present evaporator system is also designed so that the starting sequence can be manually stopped by an operator of the evaporator system by pressing, for example, on a corresponding button of the control panel of the controller (either the same button as the aforementioned one and/or another one).

Figure 2:
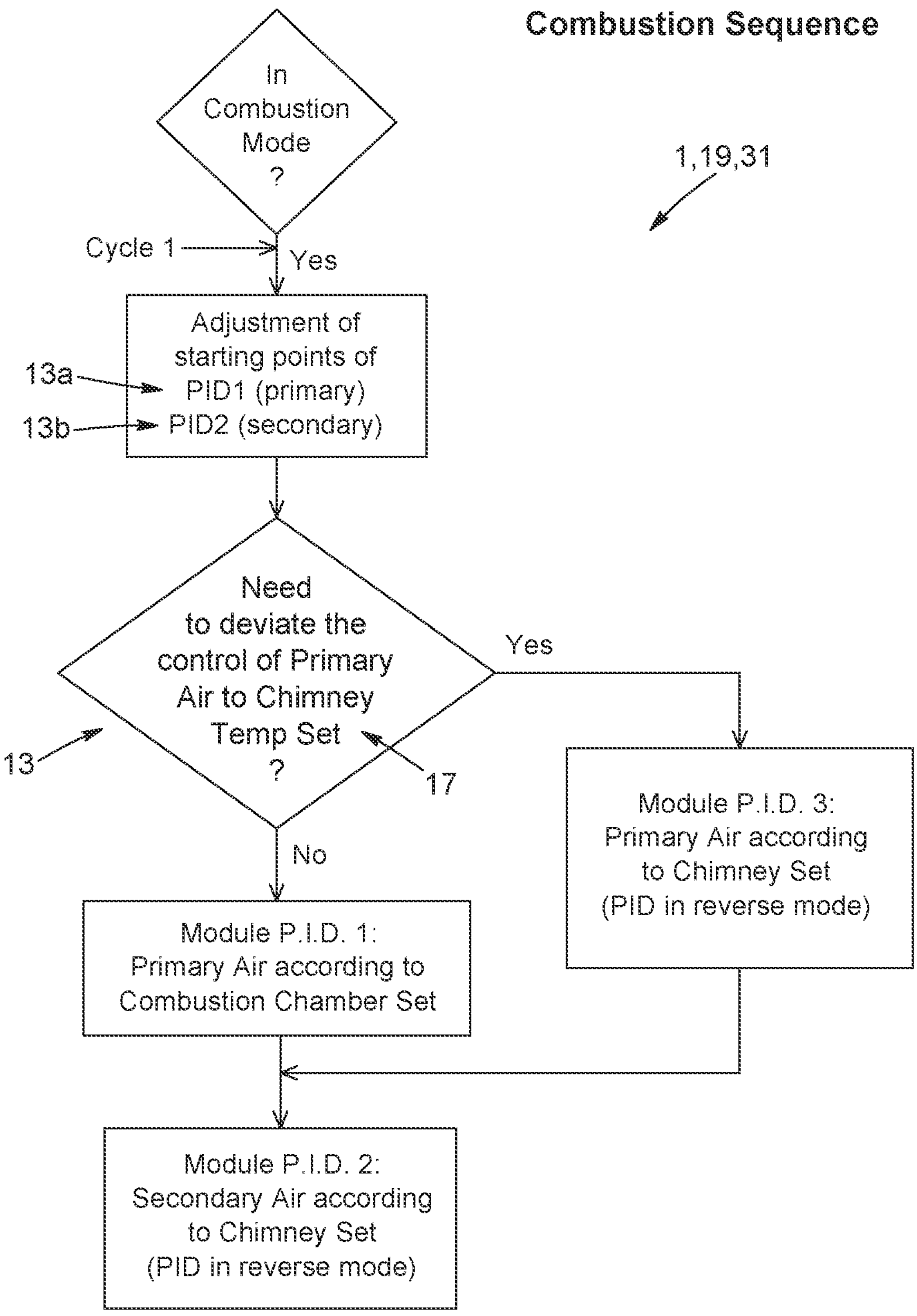
FIG. 2 represents a schematic view of a flowchart of a "combustion" sequence (also known as an "operating" sequence, or "operating mode") of a controller according to a particular embodiment of the present invention.

According to another possible embodiment, and referring generally to FIG. 2 of the present application, the controller also includes a combustion sequence.

This combustion sequence may include a step where the fan of primary air is adjusted according to a desired temperature of the exhaust gases in the chimney of the evaporator system. The combustion sequence may also include a step of security where the fan of primary air is reduced or stopped if the operating temperature in the combustion chamber of the evaporator system reaches a predetermined value (ex. about 950° F.).

Optionally, the combustion sequence includes one and/or several of the following steps: a step where the fan of primary air is adjusted according to the operating temperature in the combustion chamber of the evaporator system; a step where the fan of secondary air is adjusted according to a desired temperature of the exhaust gases in the chimney of the evaporator system; and a step where the fan of intermediate air is adjusted according to a desired temperature of the exhaust gases in the chimney of the evaporator system.

The controller may indicate that a reload of biomass is required for the evaporator system when the operating temperature in the combustion chamber decreases during a given period of time without going back up. The controller may also indicate that a reload of biomass is required in the evaporator system when the controller detects that all the fans of air operate at maximal values. The controller may also indicate that a reload of biomass is required for the evaporator system when the operating temperature in the combustion chamber reaches a given regression temperature having been previously entered by an operator of the evaporator system into the control panel of the controller. The controller may also indicate that a reload of biomass is required for the evaporator system when a preestablished period of countdown time having been previously entered by an operator of the evaporator system into the control panel of the controller has elapsed.

Figure 3:
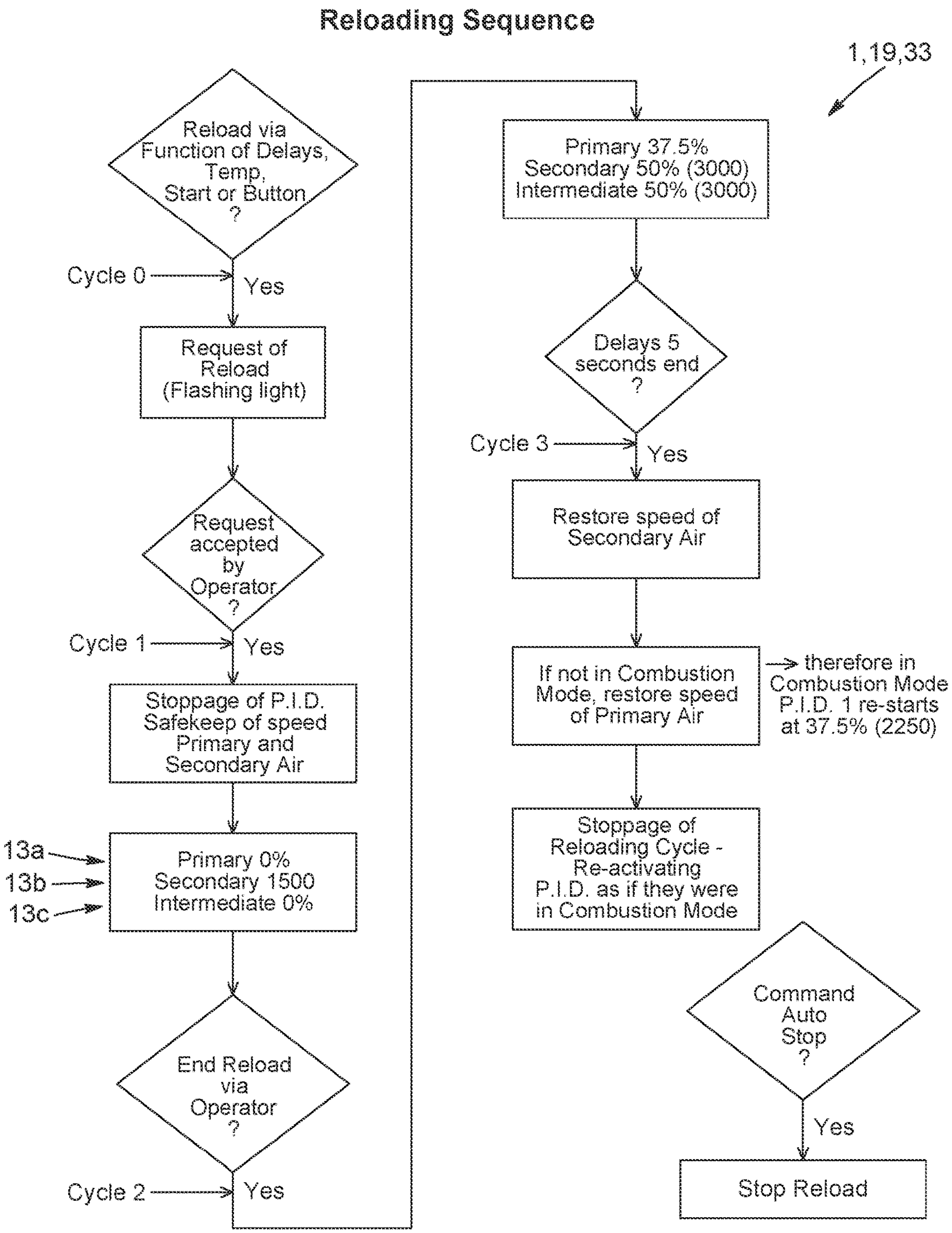
FIG. 3 represents a schematic view of a flowchart of a "reload" sequence of a controller according to a particular embodiment of the present invention.

According to another possible embodiment, and referring generally to FIG. 3 of the present application, the controller also includes a reload sequence.

Optionally, this reload sequence may be signalled by a visual and/or audio warning of the controller of the evaporator system. The visual warning may be a blinking on a corresponding button of the control panel of the evaporator system, for example, in which case, the reload sequence may be configured so as to require being accepted by an operator of the evaporator system, by pressing on this very same corresponding button (and/or other) of the control panel of the evaporator system, so as to pass to another step of the reload sequence.

Preferably, the reload sequence includes a step where the fan of primary air, the fan of secondary air and the fan of intermediate air, are operated at different values, during at least one given range of time, and/or can also include a step where the fan of primary air and the fan of intermediate air, are operated at zero, for example.

According to a possible embodiment, the aforementioned visual warning (and/or other) changes visual form (ex. can pass from a “blinking” to a “continuous” luminous warning, for example) to indicate to the operator that the access door of the evaporator system may be opened. Alternatively, different colors (ex. “green”, “yellow” and “red”) on the aforementioned button(s) (and/or other buttons and/or other components of the controller), could be used in order to be able to advise a user of the present evaporator system that he/she may pass to from one step to another, etc.

The reload sequence may also includes a step of opening the access door of the combustion chamber for allowing an introduction of new biomass into said combustion chamber of the evaporator system, as well as a step of closing of the access door of the combustion chamber. Similarly to what discussed previously, the reload sequence may include a step of confirmation of closing of the door of the combustion chamber, and this step of confirmation of closing of the door of the combustion chamber during the reload sequence may be confirmed by the operator by the evaporator system by pressing on a corresponding button of the control panel warning (ex. said corresponding button for confirming that the door of the combustion chamber is closed can be a physical button being provided with the visual warning, for example), and/or the step of confirmation of closing of the door of the combustion chamber during the reload sequence could be automatically detected by a door detection device of the controller of the evaporator system. Optionally also, the evaporator system may include a stop button for the reload sequence.

Figure 4:
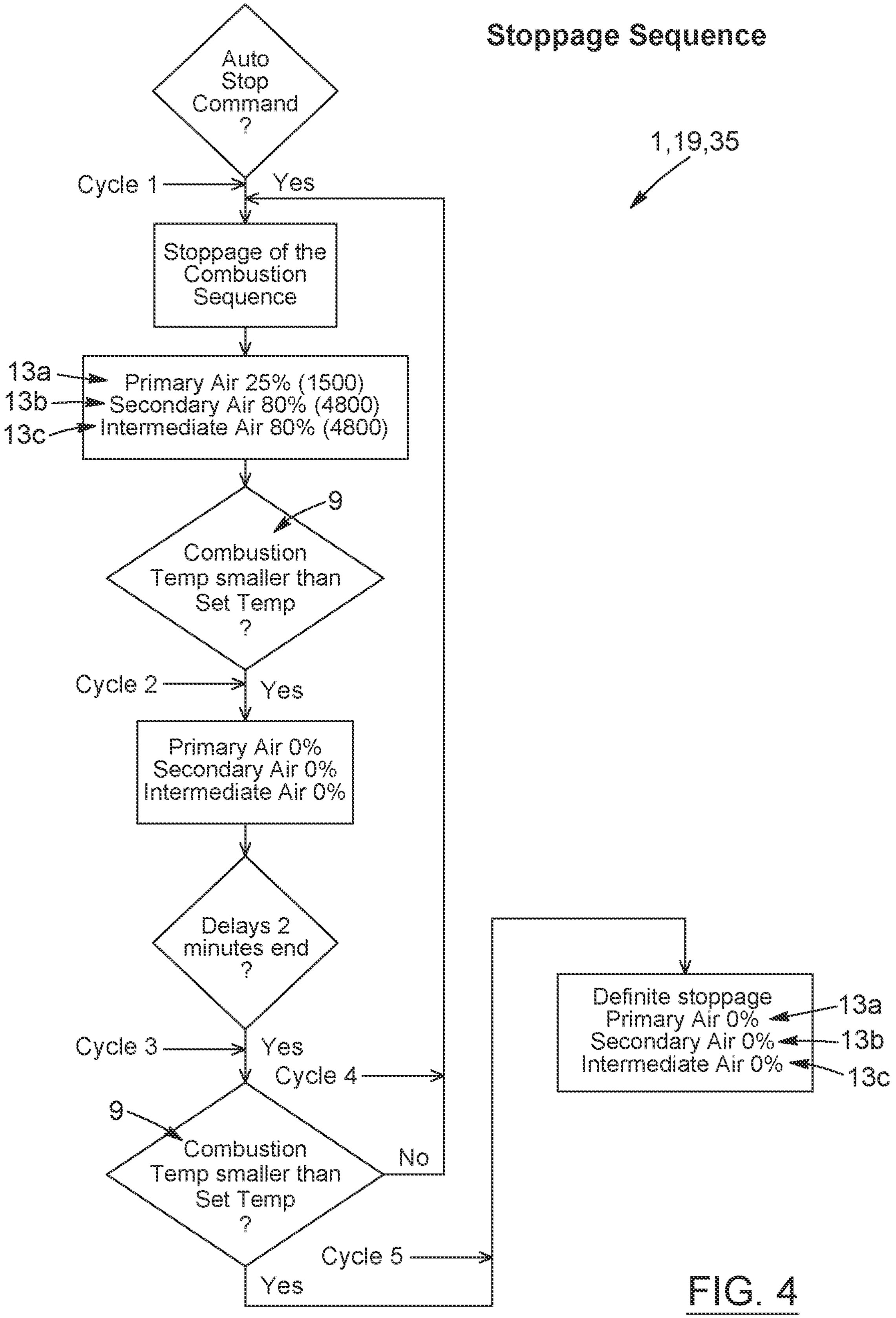
FIG. 4 represents a schematic view of a flowchart of a "stoppage" sequence of a controller according to a particular embodiment of the present invention.
Figure 5:
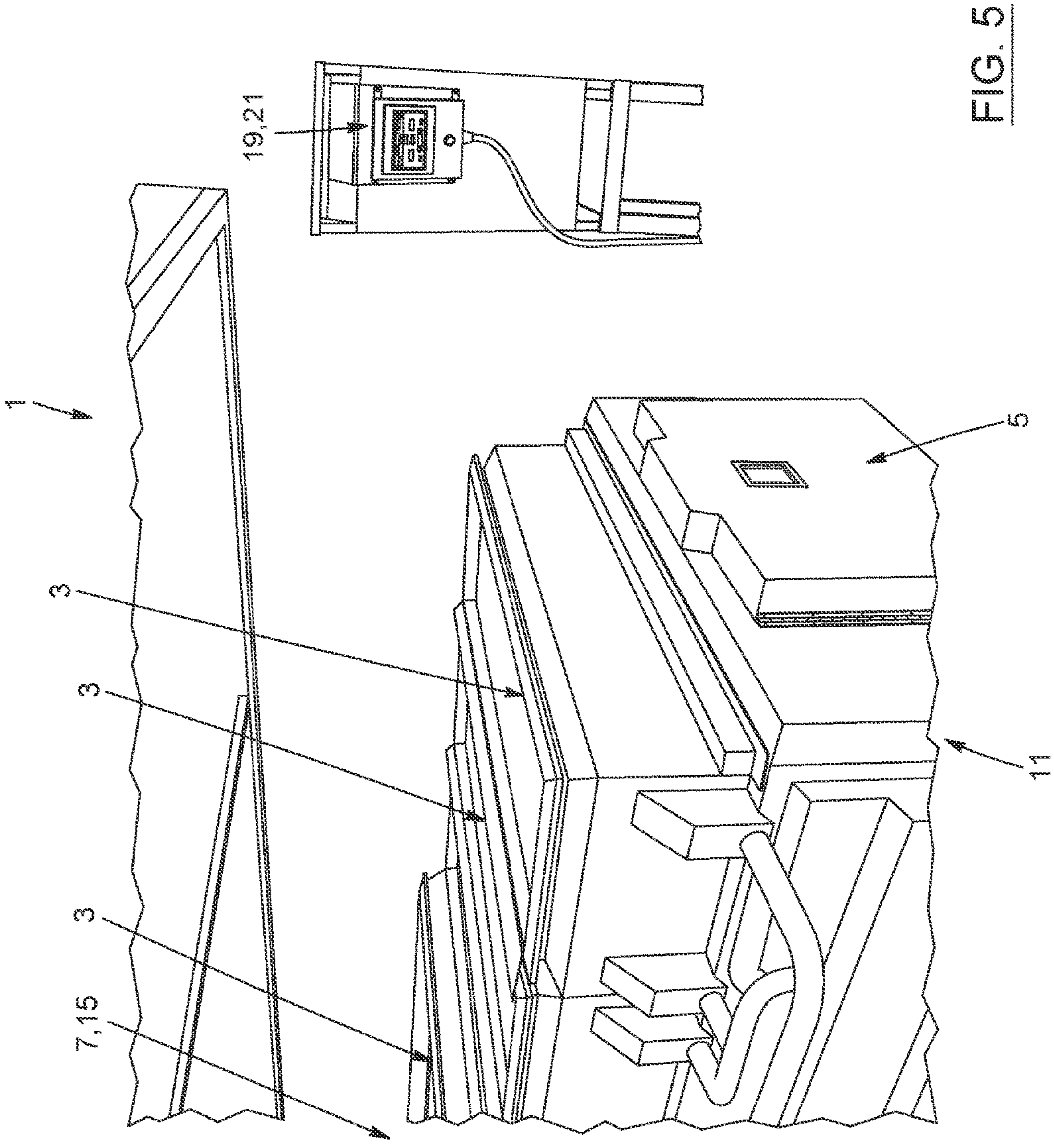
FIG. 5 is a partial view of an evaporator system provided with a controller according to a particular embodiment of the present invention, the controller being provided with a control panel.
Figure 6:
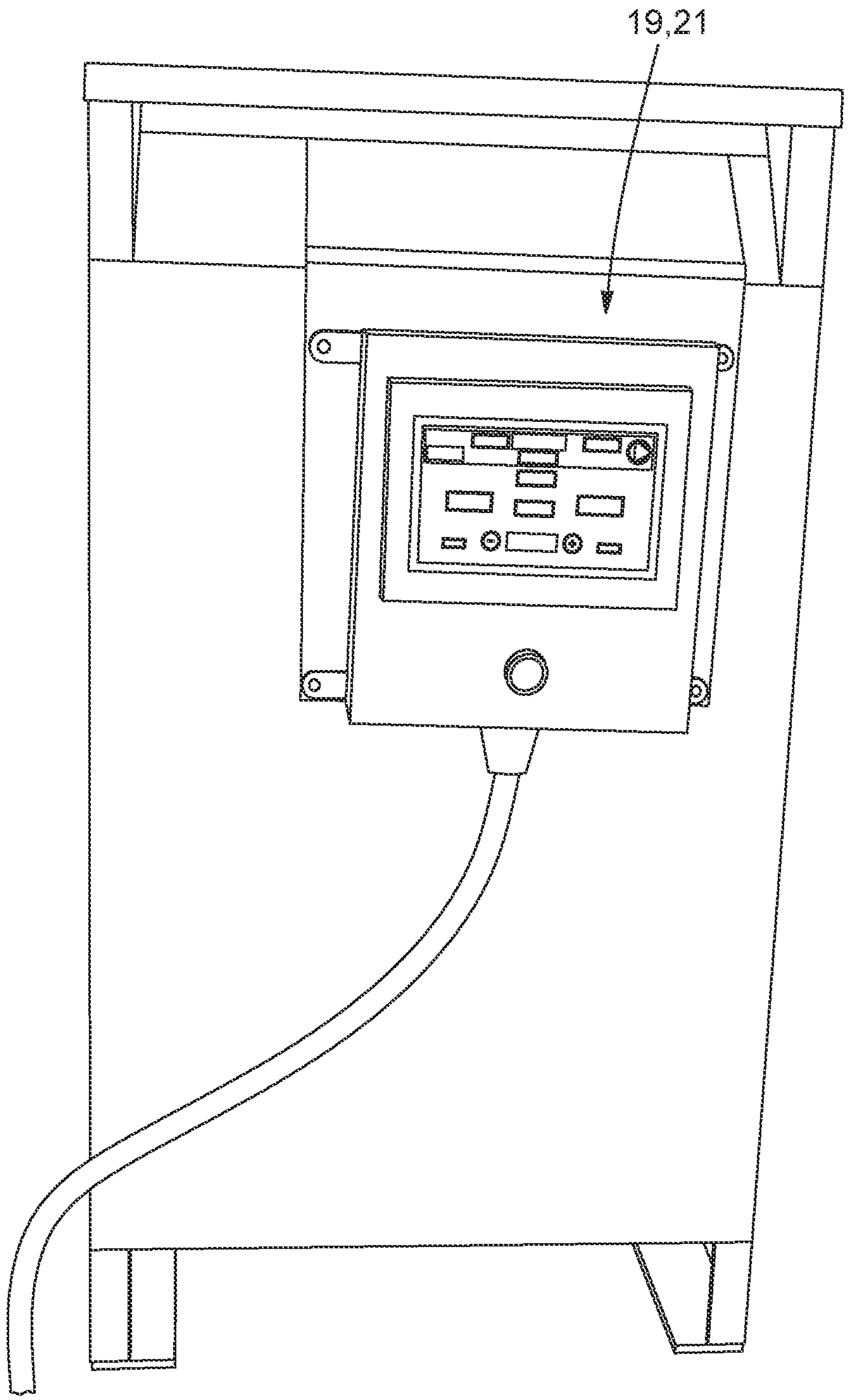
FIG. 6 is an enlarged view of the control panel of the controller shown in FIG. 5.
Figure 7:
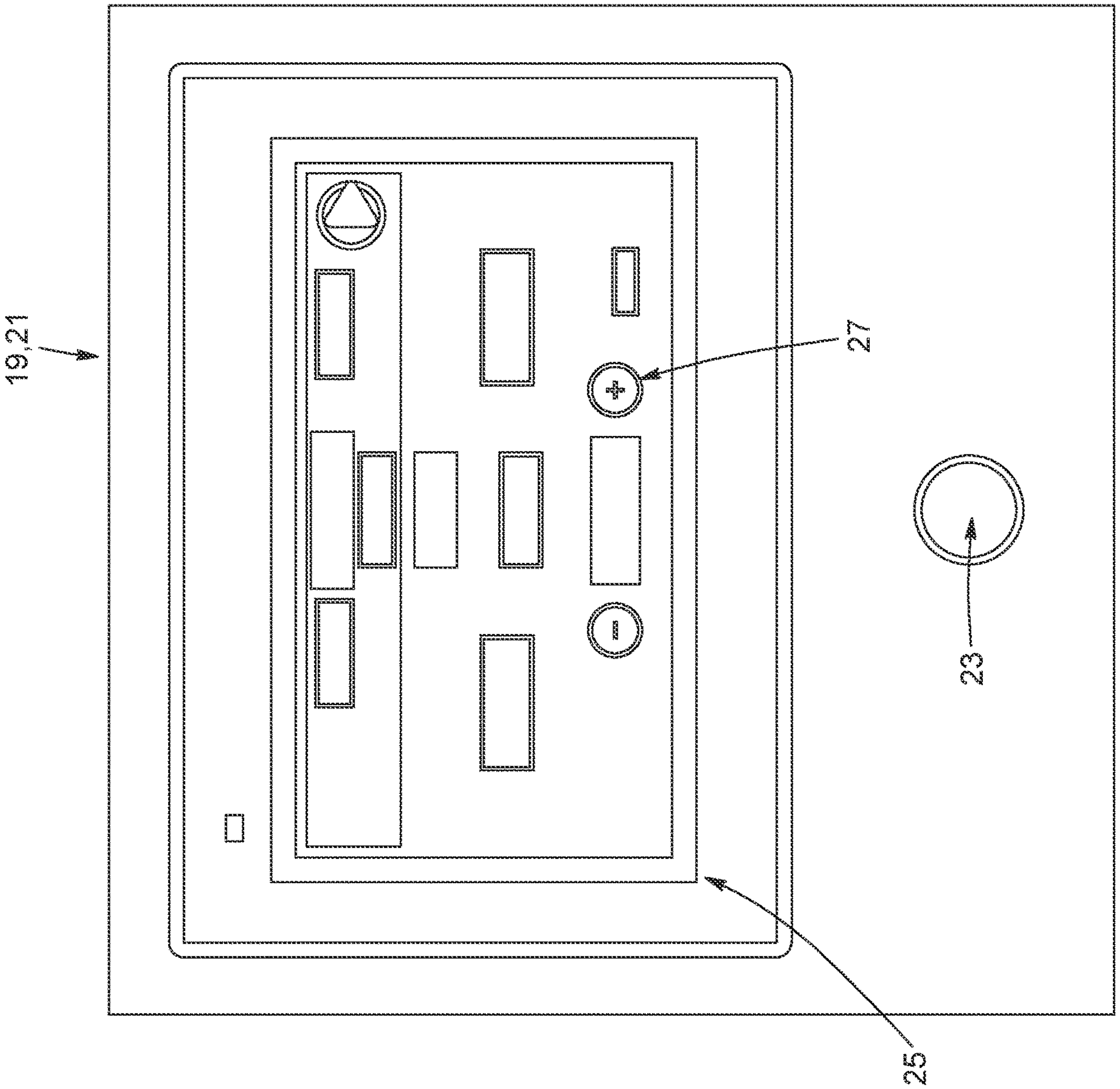
FIG. 7 is an enlarged view of the touchscreen and activation button of the control panel of the controller shown in FIG. 5.
Figure 8:
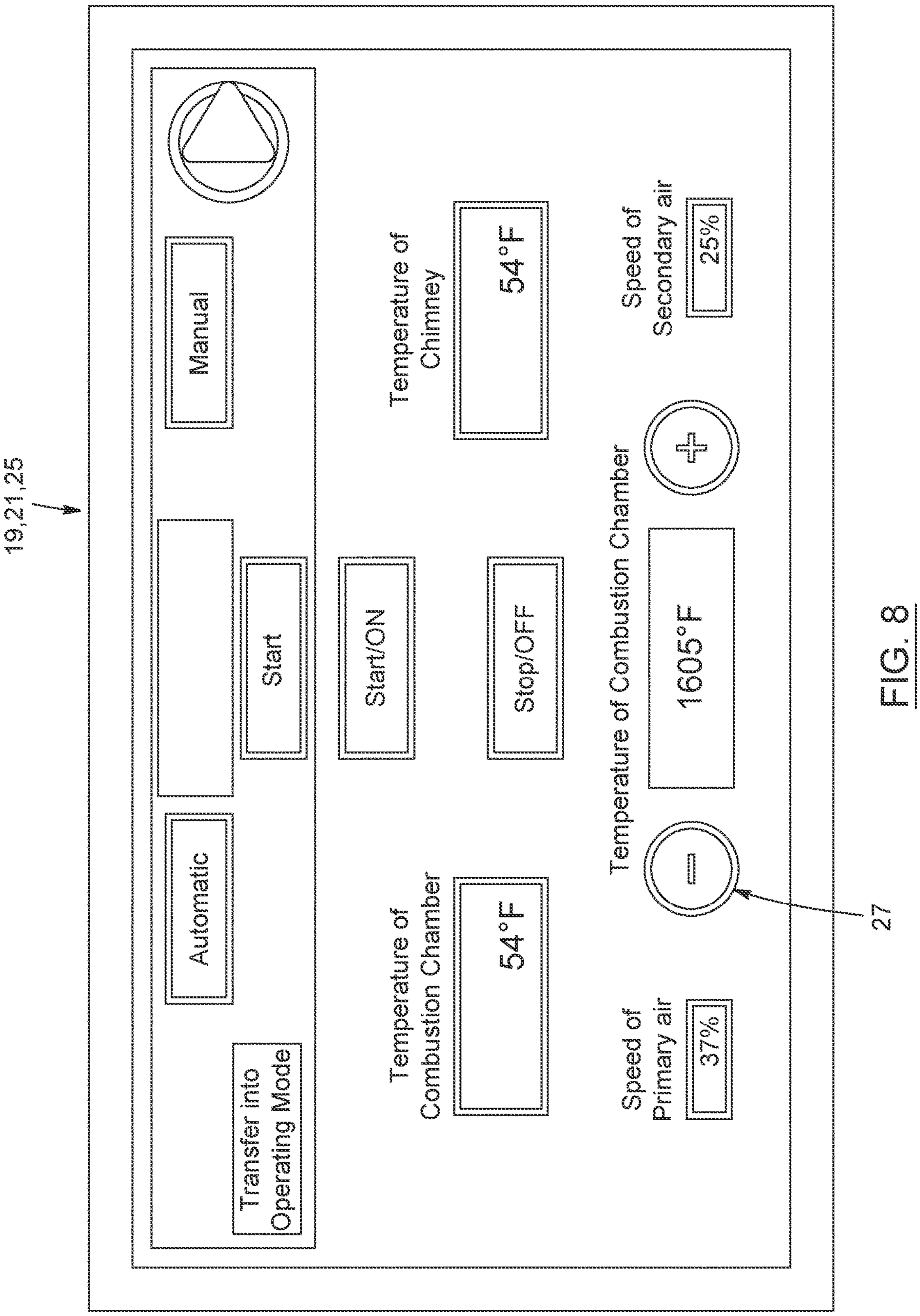
FIG. 8 is an enlarged view of the touchscreen shown in FIG. 7, the touchscreen being provided with command buttons and displays of information on the evaporator system according to a particular embodiment of the present invention.

According to another possible embodiment, and referring generally to FIG. 4 of the present application, the controller also includes a stoppage sequence.

The stoppage sequence may be triggered manually by pressing on a corresponding button of the control panel, and/or the stoppage sequence may be automatically triggered by the controller when the evaporator system has not been fed with a new reload of biomass during a given period of inactivity.

Preferably, the stoppage sequence includes a step wherein said at least one fan of the air supply system offering at least one type of air supply to the combustion chamber, is operated at a preestablished value during at least one given range of time. For example, the fan of primary air, the fan of secondary air and the fan of intermediate air are operated at predetermined values (ex. about 25%, 80% and 80 respectively—see FIG. 4—given for exemplification purposes only) when the stoppage sequence is initiated for the evaporator system, to ensure a complete combustion of the biomass present in the combustion chamber and a gradual cooling of the evaporator system.

According to a particular embodiment, and after said given range of time, the controller measures the operating temperature in the combustion chamber to determine if it is inferior to a given stoppage temperature, in which case, the controller continues to operate said at least one fan of the air supply system offering at least one type of air supply to the combustion chamber, at said preestablished value of the stoppage sequence, during a cooling period.

Preferably, after said cooling period, the controller measures the operating temperature inside the combustion chamber to determine if it is inferior to a given stoppage temperature, and in the contrary, the controller continues to operate said at least one fan of the air supply system offering at least one type of air supply to the combustion chamber, at said preestablished value of the stoppage sequence, during another cooling period.

Preferably also, and after said another cooling period, the controller measures the operating temperature in a combustion chamber to determine if it is inferior to a given stoppage temperature, in which case, said at least one fan of the air supply system offering at least one type of air supply to the combustion chamber, is operated at zero.

Preferably, the value of each fan of air is displayed by the controller according to a percentage of maximum air flow rate.

According to a possible embodiment, the evaporator system may include at least one detector of level of maple water in said at least one receptacle, and wherein the controller commands adjustably and automatically a feeding of maple water into said at least one receptacle according to a level of maple water being detected.

Optionally, the control panel of the controller displays several parameters related to an operation in progress of the evaporator system, these parameters being chosen among the group consisting of: a) temperature of combustion chamber; b) temperature of chimney; c) percentage of $CO_2$ at an outlet of the combustion chamber (ex. in the chimney, and/or elsewhere); d) value of influx of primary air; e) value of influx of secondary air; f) value of influx of intermediate air; g) value of regression temperature having been chosen; h) value of countdown time having been chosen; i) level of water; and j) status of the operation mode of the controller.

Preferably, the control panel of the controller includes command buttons (ex. one(s) physical button(s) and/or on a touchscreen) for adjusting the parameters of the evaporator system.

Preferably also, the controller includes a memory and a corresponding visual platform for retaining in memory and displaying informations related to a past operation of the evaporator system, these informations being chosen among the group consisting of: a) lengths of reload; b) time of maximal reload; c) time of minimal reload; d) time between reloads; e) maximum temperature of combustion; f) maximum temperature of chimney; g) quantity of biomass introduced for each reload; and h) levels of water.

The present invention also relates to evaporators (ex. gasification ones and/or) provided with such a controller of the release of energy, with devices and/or with necessary software(s) to put into practice the invention, as well as to any other related and/or analogous inventive aspects. Namely, the present invention also concerns a kit with components destined to be assembled and/or to put into practice the present invention, and also relates to corresponding methods of assembling, operating and use associated thereto.

Several changes, additions, modifications and/or alterations can be made to the present evaporator system, without changing nor altering the nature and the scope of the present invention.

For example, concerning the management of the "temperature", it is important to note that the monitoring of the temperatures can be ensured by usual probes of measure of temperature that include, but are not limited to: thermocouple; thermistor; and/or infrared probe. Indeed, each detector temperature of the evaporator system could thus be a detector selected from the group consisting of thermometer, thermocouple, thermistor and/or infrared probe.

Furthermore, concerning the management of the "chemical composition" of the exhaust gases (typically carried out in the chimney, but could also be done elsewhere in the system), it is imported to note that the monitoring of the composition of the products of combustion can be ensured by usual probes of measure that include, but are not limited to: lambda probe for measuring the ratio $CO_2/O_2$; measure the electrical conductivity of the combustion products; and/or infrared.

Furthermore, concerning the management of the "air flow" (ex. primary, secondary and/or intermediate), it is important to note that an air flow can be carried out by: a) the natural pull of a chimney; b) mechanically with a fan, pressurizing air that is brought to the required locations; c) mechanically with a fan by sucking the combustion products towards an outside; d) mechanically by using a high-pressure jet of air in a venturi in order to pressurize air that will be brought to the required locations; and/or e) mechanically by using a high pressure jet of air downstream of the combustion chamber, which would cause an aspiration of the combustion products (ex. exhaust gases and/or other products of combustion) towards the outside, etc.

Indeed, the flow air is controllable and can be modulated, it is important to mention that even though the present invention can operate with three (3) different types of air supplies (ex. primary, secondary and/or intermediate), the presence of these three (3) are not necessary in the context of the present invention, as apparent for a person skilled in the art. Indeed, for various small machines, the present system could be designed and operate with two (2) fans only rather than with three (3), and in certain cases, one could have one (1) single fan, such as the fan of primary air, for example, which could also feed the secondary air, for example. Consequently, and as previously mentioned, it is important to note that the advantage of the present evaporator system does not necessary reside and/or only in the number and/or the different types of air supplies possible (ex. primary, secondary, and/or intermediate) and/or on the different combinations thereof, but rather on the fact that the influx of air can be modulated according to the needs of the combustion.

Furthermore, concerning the "controller", and/or the management of the "controller" of the evaporator system, it is important to mention that any other type of "controller" other than the one described in the present application could be used for the present evaporator system, to the extent that this "controller" can be a mechanical system, an electromechanical system, an electronic system, a processor and/or a computer that can be programmed with parameters having to be maintained during the operation of the evaporator system, such as for example: a) a setpoint temperature in the combustion chamber; b) a setpoint temperature downstream of the combustion chamber; c) composition of the combustion products; d) can include reaction algorithms that react in response to situations; e) can include an access control for human intervention; f) can monitor temperatures; g) can monitor the chemical composition of the combustion products; h) control the influx of combustion air; and/or i) react of the variation of the different parameters being monitored and in accordance to a lapse of time; etc., as apparent for a person skilled in the art.

As may now be better appreciated in view of the above, the present invention is particularly advantageous in that it enables to control the release of energy of a combustion of biomass (ex. wood, etc.) with a process (ex. a controller, system, software, etc.) of automatization and of probe(s), and thus, it enables also to keep a more constant temperature range, and during a longer time, with less of variations and/or while minimizing the adverse effects of the different steps of the process of combustion (ex. starting, reload, etc.), comparatively to what is possible with conventional evaporators. As can also be better appreciated, the present invention is also advantageous in that it offers advantages, namely with respect to the quality of combustion, with respect to the quality of the resulting product, with respect to a reduction of polluting emissions being produced, with respect to a reduction of quantity of biomass (ex. wood, etc.) being used, etc.

Indeed, the present system enables the control the release of energy from a combustion of biomass, as used in a wood evaporator, for example, and to be able to do so in a quicker, simpler, more precise, more efficient, more economical, more reliable, more adjustable, more versatile, more adaptable, more durable, more environmentally conscientious, more desirable, and/or improved manner, than what is possible with the actual way of doing things.

Finally, and according to the present invention, the controller (and/or resulting system) and its corresponding parts are preferably made of substantially rigid materials, such as metallic materials (stainless steel, etc.), hardened polymers, composite materials, and/or any other appropriate material, whereas the other components of the system according to the present invention, in order to obtain the advantages discussed above, could be made of any other appropriate material, such as polymeric materials (ex. plastic, rubber, etc.), and/or any other suitable material, depending on the particular applications for which the system is intended for and the different parameters in cause, as apparent to a person skilled in the art.

Although the present invention has been previously explained by way of preferred embodiments, it is to be understood that any modification to these preferred embodiments is not considered changing nor altering the nature and the scope of the present invention. Indeed, the scope of the enclosed claim(s) should not be limited by the preferred embodiments set forth in the examples, but should be given the broadest interpretation consistent with the description as a whole.

The invention claimed is:

1. An evaporator system used for production of maple syrup, the evaporator system comprising: at least one receptacle for receiving and processing maple water destined to be transformed into the maple syrup; a combustion chamber being operatively disposed with respect to said at least one receptacle for feeding the receptacle with heat destined for a transformation of the maple water into the maple syrup, the combustion chamber having an inlet for receiving and burning biomass inside of the combustion chamber, exhaust gases of the combustion chamber being evacuated via a chimney of the evaporator system; a detector of temperature being operatively connected to the combustion chamber for determining an operating temperature inside of the combustion chamber; and an air supply system being operatively mounted with respect to the combustion chamber for feeding the combustion chamber with air destined to be used in a combustion of the biomass, the air supply system offering at least one air supply to the combustion chamber selected from the group consisting of a primary air supply, a secondary air supply and an intermediate air supply, the air supply system including at least one fan for generating said at least one air supply to the combustion chamber;

wherein the evaporator system comprises a detector of a composition of the exhaust gases in the combustion chamber so as to be able to manage a control of a release of energy of the combustion of the biomass in the combustion chamber according to a reading of the detector of the composition of the exhaust gases;

wherein said at least one fan of the air supply system offering the at least one air supply to the combustion chamber, is adjusted automatically, based on a reading of the detector of the composition of the exhaust gases, for ensuring an optimal combustion of the biomass;

wherein the air supply system offering at least one air supply to the combustion chamber is provided with at least one modulating adjustment mean for the at least one air supply: wherein a variation of a debit of air of said at least one fan of the air supply system offering the at least one air supply to the combustion chamber, is done automatically by a controller according to a reading of the operating temperature inside of the combustion chamber; and wherein the controller configured to operate with separate starting, combustion, reload and stoppage sequences, and to control said at least one fan of the air supply system offering the at least one air supply to the combustion chamber, for transmitting an air flow being automatically variable according to the operating temperature in the combustion chamber, so as to control the release of energy from the combustion of the biomass in the combustion chamber, thus in order to enable a more constant release of energy in the combustion chamber during the production of the maple syrup.

2. An evaporator system according to claim 1, wherein the detector of the composition of the exhaust gases is positioned in an outlet of the evaporator system.

3. An evaporator system comprising to claim 1, wherein the evaporator system comprises a detector of temperature of the exhaust gases being positioned in an outlet of the evaporator system.

4. An evaporator system according to claim 1, wherein the controller configured to operate in a manual mode and an automatic mode.

5. An evaporator system according to claim 4, wherein in the automatic mode, the controller is configured to control said at least one fan of the air supply system offering the at least one air supply to the combustion chamber, to increase the debit of primary air when the temperature of the combustion chamber is below a given setpoint temperature of the evaporator system.

6. An evaporator system according to claim 5, wherein in the automatic mode, the controller is configured to control said at least one fan of the air supply system offering the at least one air supply to the combustion chamber, to decrease the debit of secondary air when the composition of the exhaust gases is below a given setpoint percentage in terms of CO2 present in the exhaust gases of the evaporator system.

7. An evaporator system according to claim 6, wherein in the automatic mode, the controller is configured to control said at least one fan of the air supply system offering the at least one air supply to the combustion chamber, to increase the debit of secondary air when the composition of the exhaust gases is above a given setpoint percentage in terms of CO2 present in the exhaust gases of the evaporator system.

8. An evaporator system according to claim 7, wherein in the automatic mode, the controller is configured to control said at least one fan of the air supply system to decrease the debit of primary air when the temperature of the exhaust gases of the combustion chamber is above a given setpoint temperature of the evaporator system.

9. An evaporator system according to claim 1, the starting sequence includes a step of feeding with electricity the evaporator system and of the controller; wherein the step of feeding with electricity the evaporator system and of the controller is activated by pressing on an activation button present on a control panel of the evaporator system; wherein the starting sequence includes a step where said at least one fan of the air supply system offering the at least one air supply to the combustion chamber, is adjusted to zero; wherein the starting sequence includes a step of opening an access door of the combustion chamber for allowing an introduction of biomass into said combustion chamber; wherein the starting sequence includes a step of closing of the access door of the combustion chamber; wherein the starting sequence comprises a step of confirmation of closing of the access door of the combustion chamber; wherein the step of confirmation of closing of the access door of the combustion chamber is confirmed by an operator of the evaporator system by pressing a button of the control panel; wherein the step of confirmation of closing of the access door of the combustion chamber is detected automatically by a door detection device of the controller of the evaporator system; wherein the starting sequence includes a step wherein said at least one fan of the air supply system offering the at least one air supply to the combustion chamber, is operated at a preestablished value during at least one given range of time; wherein said at least one given range of time includes at least two given ranges of time; wherein said at least one given range of time includes at least three given ranges of time; wherein the given range of time is substantially equivalent in terms of time to that of a preceding range of time; wherein the given range of time lasts a predetermined period; wherein the given range of time is different in terms of time to that of a preceding range of time; wherein for the given range of time, said at least one fan of the air supply system offering the at least one air supply to the combustion chamber, is operated at a preestablished value being greater than that of a preceding given range of time; wherein the starting sequence is automatically stopped by the controller of the evaporator system when the operating temperature in the combustion chamber reaches a given setpoint temperature having been previously entered by an operator of the evaporator system into the control panel of the controller; wherein the controller automatically allows the evaporator system to pass to another operating sequence when the operating temperature in the combustion chamber reaches the given setpoint temperature; wherein said at least one fan of the air supply system offering the at least one air supply to the combustion chamber, is operated at a preestablished value being greater than that of a preceding given range of time, and during at least one additional given range of time, until the operating temperature in the combustion chamber reaches the given setpoint temperature; wherein the at least one additional given range of time is preceded by an introduction of biomass in the combustion chamber; wherein said at least one fan of the air supply system offering the at least one air supply to the combustion chamber, is operated at a preestablished value being greater than that of a previous given range of time, and during at least one subsequent given range of time, until the operating temperature in the combustion chamber reaches the given setpoint temperature; wherein said at least one subsequent given range of time is preceded by an introduction of biomass in the combustion chamber; wherein the air supply system includes at least one fan selected from the group consisting of a fan of primary air, a fan of secondary air and a fan of intermediate air; wherein the starting sequence includes a step where the fan of primary air, the fan of secondary air and the fan of the intermediate air, are operated at different preestablished values, during several different ranges of time, so as to bring the combustion chamber to a desired operating temperature; wherein the fan of primary air, the fan of secondary air and the fan of intermediate air, are adjusted automatically by the controller in accordance to the operating temperature desired in the combustion chamber, corresponding to a given setpoint temperature previously entered by an operator of the evaporator system into the control panel of the controller; wherein the given setpoint temperature is located between about 1200° F. and about 1900° F.; wherein the starting sequence is automatically stopped by the controller of the evaporator system when the operating temperature in the combustion chamber reaches the given setpoint temperature, so as to automatically pass to another operating sequence of the evaporator system; or wherein the starting sequence is manually stopped by an operator of the evaporator system by pressing on the button of the control panel of the controller.

10. An evaporator system according to claim 1, wherein the combustion sequence includes a step where the fan of primary air is adjusted according to a desired temperature of the exhaust gases in the chimney of the evaporator system; wherein the combustion sequence includes a step of security where the fan of primary air is reduced or stopped when the operating temperature in the combustion chamber of the evaporator system reaches about 950° F.: wherein the combustion sequence includes a step where the fan of primary air is adjusted according to the operating temperature in the combustion chamber of the evaporator system; wherein the combustion sequence includes a step where the fan of secondary air is adjusted according to a desired temperature of the exhaust gases in the chimney of the evaporator system; wherein the combustion sequence includes a step where the fan of intermediate air is adjusted according to a desired temperature of the exhaust gases in the chimney of the evaporator system; wherein the controller indicates that a reload of biomass is required for the evaporator system when the operating temperature in the combustion chamber decreases during a given period of time without going back up; wherein the controller indicates that a reload of biomass is required in the evaporator system when the controller detects that the fans of air operate at maximal values; wherein the controller indicates that a reload of biomass is required for the evaporator system when the operating temperature in the combustion chamber reaches a given regression temperature having been previously entered by an operator of the evaporator system into a control panel of the controller; or wherein the controller indicates that a reload of biomass is required for the evaporator system when a preestablished period of countdown time has having been previously entered by an operator of the evaporator system into the control panel of the controller has elapsed.

11. An evaporator system according to claim 1, wherein the reload sequence is signalled by a visual or audio warning of the controller of the evaporator system; wherein the visual warning is a blinking on a button of a control panel of the evaporator system; wherein the reload sequence must be accepted by an operator of the evaporator system, by pressing on the button of the control panel of the evaporator system, so as to pass to another step of the reload sequence; wherein the reload sequence includes a step where the fan of primary air, the fan of secondary air and the fan of intermediate air, are operated at different values, during at least one given range of time; wherein the reload sequence includes a step where the fan of primary air and the fan of intermediate air, are operated at zero; wherein the visual warning changes visual form to indicate to the operator that an access door of the evaporator system can be opened; wherein the reload sequence includes a step of opening the access door of the combustion chamber for allowing an introduction of new biomass into said combustion chamber of the evaporator system; wherein the reload sequence includes a step of closing of the access door of the combustion chamber; wherein the reload sequence includes a step of confirmation of closing of the access door of the combustion chamber; wherein the step of confirmation of closing of the access door of the combustion chamber during the reload sequence is confirmed by the operator by the evaporator system by pressing on the button of the control panel; wherein said corresponding button for confirming that the access door of the combustion chamber is closed, is a physical button being provided with the visual warning; wherein the step of confirmation of closing of the access door of the combustion chamber during the reload sequence is automatically detected by a door detection device of the controller of the evaporator system; or wherein the evaporator system includes a stop button for the reload sequence.

12. An evaporator system according to claim 1, wherein the stoppage sequence is triggered manually by pressing on a button of a control panel; wherein the stoppage sequence is automatically triggered by the controller when the evaporator system has not been fed with a new reload of biomass during a given period of inactivity; wherein the stoppage sequence includes a step wherein said at least one fan of the air supply system offering the at least one air supply to the combustion chamber, is operated at a preestablished value during at least one given range of time; wherein the fan of primary air, the fan of secondary air and the fan of intermediate air are operated at predetermined values when the stoppage sequences is initiated to ensure a complete combustion of the biomass present in the combustion chamber and a gradual cooling of the evaporator system; wherein after said given range of time, the controller measures the operating temperature in the combustion chamber to determine when the operating temperature is inferior to a given stoppage temperature, in which case, the controller continues to operate said at least one fan of the air supply system offering the at least one air supply to the combustion chamber, at said preestablished value of the stoppage sequence, during a cooling period; wherein after said cooling period, the controller measures the operating temperature inside the combustion chamber to determine when the operating temperature is inferior to a given stoppage temperature, the controller continues to operate said at least one fan of the air supply system offering the at least one air supply to the combustion chamber, at said preestablished value of the stoppage sequence, during another cooling period; or wherein after said another cooling period, the controller measures the operating temperature in a combustion chamber to determine when the operating temperature is inferior to a given stoppage temperature, in which case, said at least one fan of the air supply system offering the at least one air supply to the combustion chamber, is operated at zero.

13. An evaporator system according to claim 8, wherein a value of the fan of air is displayed by the controller according to a percentage of a maximal flow of air.

14. An evaporator system according to claim 8, wherein the evaporator system includes at least one detector of level of the maple water in said at least one receptacle, and wherein the controller commands adjustably and automatically a feeding of maple water into said at least one receptacle according to the level of the maple water being detected.

15. An evaporator system according to claim 8, wherein a control panel of the controller displays several parameters related to an operation in progress of the evaporator system, these parameters being chosen among the group consisting of: a) temperature of the combustion chamber; b) temperature of the chimney; c) percentage of CO2 in the chimney; d) value of influx of the primary air; e) value of influx of the secondary air; f) value of influx of intermediate air; g) value of regression temperature having been chosen; h) value of countdown time having been chosen; i) level of the maple water; and j) status of the operation mode of the controller.

16. An evaporator system comprising to claim 15, wherein the control panel of the controller includes command buttons for adjusting the parameters of the evaporator system.

17. An evaporator system according to claim 16, wherein said controller includes a memory and a visual platform for retaining in memory and displaying information related to a past operation of the evaporator system, the information being chosen among the group consisting of: a) lengths of a reload; b) time of maximal the reload; c) time of minimal the reload; d) time between reloads; e) maximum temperature of combustion; f) maximum temperature of chimney; g) quantity of the biomass introduced for the reload; and h) levels of the maple water.

* * * * *